Patented Sept. 21, 1954

2,689,873

UNITED STATES PATENT OFFICE 2,689,873

ALKENYL HALIDES CONTAINING A QUATERNARY CARBON ATOM

Warren D. Niederhauser, Philadelphia, Pa., assignor to Rohm & Haas Company, Philadelphia, Pa., a corporation of Delaware No Drawing. Application December 1, 1950, Serial No. 198,740

1 Claim. (Cl. 260—654)

This invention relates to new alkenyl halides and to a process for preparing them. It relates to the preparation of allylic chlorides or bromides having the following general formula

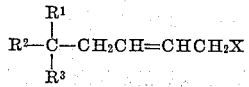

in which $R^1$, $R^2$, and $R^3$ each represent an alkyl group which contains one to eighteen carbon atoms and X is an atom of chlorine or bromine.

These compounds are made by reacting 1,3-butadiene and a tertiary aliphatic halide of the general formula

in which the characters $R^1$, $R^2$, $R^3$, and X have the above-described significance. The reaction is carried out in the presence of a Friedel-Crafts catalyst.

The two reactants combine readily in the presence of the catalyst at temperatures from —10° C. to about 90° C. As is customary, the reaction takes place more rapidly as the temperature is raised. Also greater proportions of by-products are formed at the higher temperatures and consequently it is preferred that the reaction be carried out at a temperature from about 15° C. to about 50° C.

While the reaction can be carried out under superatmospheric pressure, there does not appear to be any substantial advantage in doing so since results are obtained at ordinary atmospheric pressure.

The catalyst which is employed is of the well known Friedel-Crafts type as typified by the halides of aluminum, titanium, antimony, bismuth, iron, boron, and zinc. Of these, zinc chloride is much preferred.

The reaction is conveniently carried out in the presence of an inert organic solvent, although a solvent is not essential to the reaction. The word "inert" is used in the accepted sense as indicating that the solvent does not react with the reactants or products under the conditions of the instant reaction. Examples of suitable solvents include aliphatic hydrocarbons, such as petroleum ether, and chlorinated aliphatic hydrocarbons, such as ethylene dichloride and carbon tetrachloride, or carboxylic acids, such as formic acid or acetic acid.

While the butadiene and the tertiary halide react in equimolar amounts, as much as a hundred percent excess of either reactant can be present.

The tertiary halides can vary one from the other as regards the three alkyl groups and the halide group which are attached to the tertiary carbon atom. Alkyl groups of one to eighteen groups are, of course, well known as exemplified by methyl, ethyl, n-butyl, isobutyl, tert.-butyl, octyl, lauryl, tetradecyl, and octadecyl groups including the isomeric forms. The alkyl groups do not, themselves, take part in the reaction and, consequently, the size and form of the alkyl groups are not significant factors insofar as the course of the reaction is concerned but they do, of course, contribute to the physical properties of the products. Likewise the tertiary bromides and chlorides react alike.

The following examples, wherein all parts are by weight, serve to show how the products of this invention are prepared and it is to be understood that any tertiary halide described above reacts with butadiene in the same manner as those shown in these examples.

Example 1

A mixture of 27.6 parts of tert.-butyl chloride, 90 parts of carbon tetrachloride, 12 parts of zinc chloride, and 19.4 parts of butadiene was charged to a water-cooled autoclave and was agitated at 28° C. for 68 hours. The crude product was washed three times with water, was dried over calcium chloride, and was then purified by distillation under reduced pressure. A 74% yield was obtained of the compound having the formula

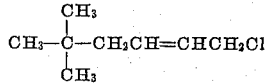

The redistilled product boiled at 61°–68° C. at 18 mm. pressure. Its structure was confirmed by analysis: 65.80% C; 10.72% H; 23.91% Cl; iodine number=162 as against the following calculated values for $C_8H_{15}Cl$: 65.53% C; 10.31% H; 24.18% Cl; iodine value=173. Furthermore, the infrared absorptive curve of the compound indicated that its double bond was entirely of the 1,2-dialkyl olefin type as shown in the above structure.

Example 2

A mixture of 31.2 parts of tert.-amyl chloride, 90 parts of carbon tetrachloride, 18 parts of zinc chloride, and 19.4 parts of 1,3-butadiene was stirred in an autoclave which was maintained at 28° C. for three days. The product was washed, dried, and purified by distillation in same manner as employed in Example 1. The product boiled at 66° C.-68° C. and 10 mm. of pressure and had an index of refraction of $N_D^{25}$ 1.4533 and a density of $d_4^{25}=0.8991$. Again the analysis confirmed that the product had this formula:

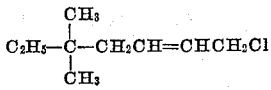

Example 3

A mixture was made of 16 parts of zinc chloride, 21.8 parts of butadiene and 60 parts of tert.-octyl chloride of the formula $$(CH_3)_3C-CH_2-C(CH_3)_2-Cl$$

This mixture was agitated in an autoclave at 30° C. for three days after which the product was washed with water, then with an aqueous solution of sodium carbonate, and again with water. Purification by distillation under reduced pressure yielded a product whose analysis corresponded to that of the compound having the formula

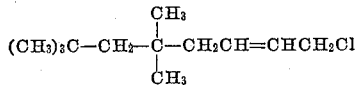

The compounds of this invention are useful as chemical intermediates for the preparation of alcohols, amines, acids, detergents, and bactericides. For example, primary dodecyl alcohol was prepared in 80% yield by the following series of reactions:

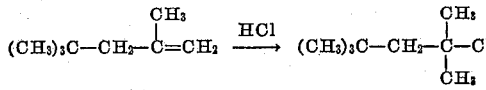

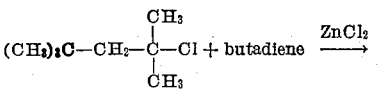

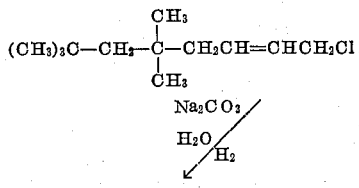

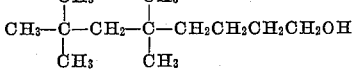

I claim:

As a new composition of matter a compound of the formula

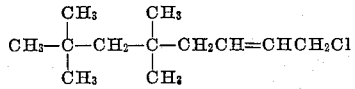

References Cited in the file of this patent

FOREIGN PATENTS

| Number | Country | Date |
|---|---|---|
| 824,909 | France | Nov. 18, 1937 |

OTHER REFERENCES

Fischer et al.: "Annalen der Chemie," vol. 475, pp. 193-4 (1929).